United States Patent Office 3,766,294
Patented Oct. 16, 1973

3,766,294
IMIDO-ALKYLENE SUBSTITUTED AROMATIC CARBOCYCLIC POLYMERS
Johann F. Klebe and Thomas J. Windish, Schenectady, N.Y., assignors to General Electric Company
No Drawing. Continuation-in-part of abandoned application Ser. No. 846,623, July 1, 1969. This application June 23, 1971, Ser. No. 156,067
Int. Cl. C08g 20/00
U.S. Cl. 260—78 UA    11 Claims

ABSTRACT OF THE DISCLOSURE

A variety of imido-alkylene substituted aromatic carbocyclic organic polymers are provided, such as polymers having pendant aromatic carbocyclic radicals, such as polystyrenes. The imido-substituted aromatic carbocyclic polymers of the present invention can be employed as molding compounds, photoresists, laminates, varnishes, adhesives, decorative coatings, etc.

This application is a continuation-in-part of our co-pending application Ser. No. 846,623, filed July 1, 1969, now abandoned and assigned to the same assignee as the present invention.

The present invention relates to various imidoalkylene substituted aromatic carbocyclic organic polymers.

The polyimides of the present invention can have at least one chemically combined "M" radical of the formula, (1)

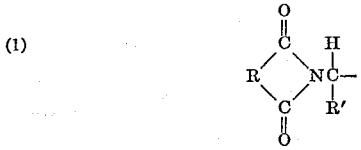

joined to a carbon atom on the ring of an aromatic carbocyclic radical of the organic polymer, where R is a divalent organo radical selected from hydrocarbon radicals and halogenated hydrocarbon radicals, R' is a monovalent radical selected from hydrogen monovalent hydrocarbon radicals and halogenated monovalent hydrocarbon radicals.

Radicals included by R, are, for example, arylene radicals, such as phenylene, bisphenylene, naphthylene, anthrylene, etc., alkylene radicals, such as ethylene, trimethylene, tetramethylene, etc., halogenated arylene and alkylene radicals such as chlorophenylene, chloronaphthylene, chloroethylene, chlorotrimethylene, etc.; aliphatically unsaturated radicals, such as

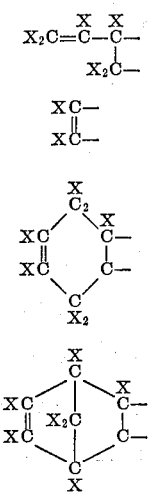

where X is a radical selected from hydrogen, lower alkyl, halogen, or mixtures thereof, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

The imido-substituted "backbone" polymers of the present invention having at least one chemically-combined M radical attached to an aromatic carbocyclic radical are shown by the formula, (2)

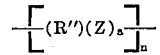

where R'' is a polyvalent aromatic organo radical selected from M-substituted aromatic carbocyclic organo radicals selected from hydrocarbon radicals and halogenated hydrocarbon radicals, and a mixture of such M-substituted aromatic carbocyclic radicals, and other polyvalent organo radicals free of M-substitution selected from hydrocarbon radicals and halogenated hydrocarbon radicals, Z is a polyvalent connective, $a$ is a whole number having a value of 0 or 1 and $n$ is an integer equal to 2 to 1,000 inclusive, and preferably 5 to 500 inclusive.

Radicals included by R'' of Formula 2 are selected from (a) M-substituted aromatic carbocyclic radicals having from 6 to 18 carbon atoms selected from hydrocarbon radicals and halogenated hydrocarbon radicals,
(b) a mixture of (a) radicals and the same aromatic carbocyclic radicals free of M-substitution, and (a), or (a) and (b) radicals,
(c) a mixture of (a), or (a) and (b) radicals, and polyvalent aliphatic radicals selected from hydrocarbon radicals and halogenated hydrocarbon radicals, where the (a) or (a) and (b) radicals are present in the mixture in an amount which is sufficient to provide for at least about 1 mole percent of (a) radicals based on the total moles of radicals in (c).

Polyvalent connectives included by Z of Formula 2 are, for example,

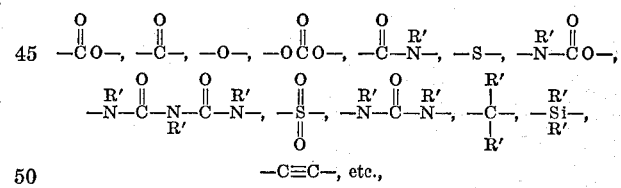

—C≡C—, etc., and mixtures thereof, where R' is as previously defined.

The imido-substituted aromatic carbocyclic organic polymers of the present invention also include M-substituted polymers of the formula, (3)

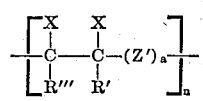

having chemically combined "pendant" aromatic carbocyclic radicals where R', $a$ and $n$ are as previously defined, R''' is an M-substituted aromatic carbocyclic radical selected from hydrocarbon radicals and halogenated hydrocarbon radicals and a mixture of such M-substituted aromatic carbocyclic radicals and other monovalent organo radicals free of M-substitution selected from hydrocarbon radicals and halogenated hydrocarbon radicals, X is selected from R' radicals and halogen radicals, and Z' is a divalent organo connective.

Radicals included by R''' of Formula 3 are pendant monovalent organo radicals selected from, (d) M-substituted aromatic carbocyclic radicals having from 6 to 18 carbon atoms selected from hydrocarbon radicals and halogenated hydrocarbon radicals, and
(e) a mixture of (d) radicals, and the same aromatic carbocyclic radicals free of M-substitution, Z' is a divalent organo connective such as, $$-\underset{\underset{H}{|}}{\overset{\overset{R'}{|}}{C}}-\underset{\underset{W}{|}}{\overset{\overset{X}{|}}{C}}-,$$

$$-\underset{\underset{H}{|}}{\overset{\overset{X}{|}}{C}}-\overset{\overset{X}{|}}{C}=\overset{\overset{X}{|}}{C}-\underset{\underset{H}{|}}{\overset{\overset{X}{|}}{C}}-,$$

$$O=C\underset{\underset{O}{\diagdown}}{\overset{\overset{-Q-}{\diagup}}{\diagdown}}C=O,$$

, etc;

and mixtures thereof, where R' and X are as previously defined, Q is a polyvalent aliphatic radical derived from aliphatically saturated monovalent hydrocarbon radicals and halogenated hydrocarbon radicals, and W is a monovalent radical selected from hydrogen, alkyl radicals, halogen radicals, aliphatic ester radicals, aromatic ester radicals, amido radicals, nitrile radicals, and aliphatic nitrile radicals.

Among the carbocyclic radicals included by R" of Formula 2 there are phenylene, tolylene, xylylene, naphthylene, anthrylene, terphenylene, etc.; halogenated derivatives of such aromatic carbocyclic radicals; M-substituted derivatives of such aromatic carbocyclic radicals, such as, a mixture of such aromatic carbocyclic radicals, or derivatives thereof, where such mixtures contain at least about 1 mole percent and up to 99 mole percent, and preferably from 10 mole percent to 99 mole percent of such M-substituted aromatic carbocyclic radicals, with from 99 mole percent to 1 mole percent, and preferably from 90 mole percent to 1 mole percent of polyvalent organo radicals which can include aromatic carbocyclic radicals previously defined, and aliphatic organo radicals such as alkylene radicals, for example, methylene, ethylene, trimethylene, etc., halogenated derivatives thereof, etc.

Among the carbocyclic radicals included by R''' of Formula 3, there are, for example, phenyl, tolyl, xylyl, naphthyl, anthryl, etc.; halogenated derivatives of such monovalent aromatic carbocyclic radicals such as chlorophenyl, bromonaphthyl, etc.; M-substituted derivatives such as, Imido-methylene radicals included by Formula 1 are, for example, aromatic imido-methylene compounds, for example, aliphatically unsaturated imido-methylenehalides of the formula, As taught in our copending application Ser. No. 838,322, filed July 1, 1969, now abandoned and assigned to the same assignee as the present invention, the imido-methylene substituted aromatic carbocyclic organic polymers of the present invention, for example, included by Formulas 2 and 3, can be made by effecting contact between an aromatic carbocyclic organic polymer, and an imido-methylene compound of the formula, (4)

in the presence of a Friedel-Crafts catalyst, where R, and R' are as previously defined and Y is a radical selected from hydroxy and halogen, such as chloro, bromo, fluoro, etc.

In addition to utilizing imido-methylene compounds of Formula 4, there also is taught in our above-identified application Ser. No. 838,322, now abandoned, the employment of an imido-alkylene compound of the formula, (5)
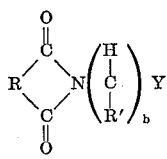

where $b$ is an integer having a value of from 2 to 4, inclusive, and R, R' and Y are as previously defined. The imido-alkylene compounds of Formula 5 can be employed with aromatic carbocyclic organic polymers included by Formula 3 in the presence of a Friedel-Crafts catalyst, such as boron trifluoride to produce pendant aromatic carbocyclic polymers having at least one chemically-combined imido radical of the formula, (6)
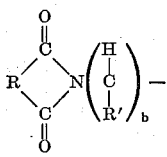

referred to hereinafter as an M' radical, where all of the terms are shown in Formula 5. The pendant aromatic carbocyclic organic polymers are included by Formula 3, except where R''' can be a mixture of aromatic carbocyclic radicals and imido-substituted aromatic carbocyclic radicals are substituted with M' radicals in place of M radicals.

Imido radicals included by Formula 6 are, for example,

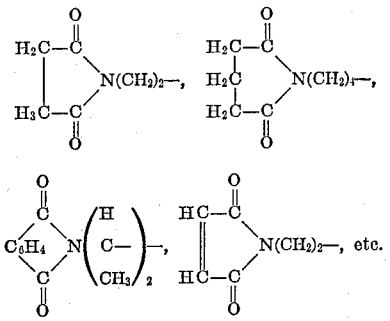

Also taught in our above-mentioned copending application is a method for introducing imido-alkylene substitution in a variety of backbone polymers, structurally similar to polymers of Formula 2 to provide for a variety of imido-substituted polyaryleneoxides, polyarylene esters, polyarylene carbonates and polyamides, as respectively shown by F. Holub and C. Emerick Ser. No. 838,316, now Pat. 3,652,710, F. Holub and M. Evans Ser. No. 838,314, now Pat. 3,652,716, Ser. No. 838,306, now Pat. 3,652,715, Ser. No. 838,315, all of which have been filed on July 1, 1969, and assigned to the same assignee as the present invention.

Among the imido-alkylene substituted aromatic carbocyclic polymers of the present invention, there are included imido-methylene substituted aromatic carbocyclic polyethers, polyesters, polycarbonates, polyamides, polyamideimides, polyimides, polysulfones, polyurethanes, polybiurets, polyxylylene, polyarylacetylenes, polysulfides, polyarylsulfides, etc. In addition, there also are included imido-alkylene substituted polystyrenes, poly(α-methylstyrene), polymethyl(α-methylstyrene), poly(dimethylstyrene), poly(chlorostyrene), poly(dichlorostyrene), styrene copolymers with butadiene, acrylonitrile, methylmethacrylate, vinylidenechloride, maleic anhydride, vinylchloride, vinylacetate, vinylamides, α-methylstyrene, etc.

In addition to the above-described imido-methylene substituted aromatic carbocyclic polymers, there also is included in the present invention imido-methylene substituted aromatic carbocyclic polymers in the form of random copolymers, block polymers, and graft copolymers containing at least 10 mole percent of R'' radicals or R''' radicals as defined in Formulas 2 and 3. For example, there are included imido-methylene substituted polystyrene-polybutadiene graft copolymers, etc.

The imido-alkylene substituted aromatic organic polymer provided by the present invention can be employed in a variety of applications depending upon such factors as the type of aromatic organic polymer, the degree of imido-alkylene substitution in the polymer, and whether the imido-alkylene radicals, as shown by Formulas 1 and 6, are aliphatically unsaturated, or free of aliphatic unsaturation. For example, in instances where the aromatic organic polymer has chemically combined imido-alkylene radicals of Formula 1 or 6 which are aliphatically unsaturated, these materials can be employed in a variety of applications such as molding compounds, varnishes, adhesives, laminating compounds, solvent-resistant coatings, dielectrics, insulating coatings, and several other applications normally requiring free radical and high energy electron curable materials convertible from the thermoplastic to the thermoset state, as more particularly shown for particular aromatic organic polymers described in the aforementioned copending applications. In instances where the aromatic organic polymers are substituted with imido-alkylene radicals of Formulas 1 and 6 which are free of aliphatic unsaturation, such aromatic organic polymers can provide for solvent-resistant coating compounds, molding resins, high temperature and oxidatively stable fibers and films, etc.

The imido-alkylene substituted aromatic organic polymers of the present invention can be blended with various aliphatically unsaturated organic materials, such as aliphatically unsaturated organic monomers and certain aliphatically unsaturated organic polymers as well as organic polymers free of aliphatic unsaturation. Blends of the imidoalkylene substituted aromatic organic polymers and the aforementioned organic monomers or polymers can be made over a wide proportion by weight. Experience has shown that there should be employed at least about 5 percent, by weight, of the imido-alkylene substituted aromatic organic polymer to provide for cured products having improved characteristics. For example, if the imido-alkylene aromatic polymer has chemically combined aliphatically unsaturated imidoalkylene radicals of Formula 1, the blend of the imido-alkylene substituted aromatic polymer with the aforementioned organic materials can be employed in making laminating compounds, solventless varnishes, molding compounds, coating compositions, etc., depending upon the proportions of the imido-aliphatically unsaturated imido-alkylene substituted aromatic organic polymer and the organic polymer or monomer utilized in the blend. Those skilled in the art would know, for example, that as the proportion of the imidoalkylene aromatic organic polymer having aliphatically unsaturated imido-alkylene radicals increased with respect to either the organic monomer or polymer in the blend, particularly where the mole percent substitution of the aliphatically unsaturated imido-alkylene radical on the aromatic organic polymer exceeded 25 mole percent or more, the degree of crosslinking of the blend would be sufficiently high to make the resulting cured product an ideal solvent-resistant coating or insulating material.

Included by the aliphatically unsaturated monomers that can be employed in combination with the imido-alkylene substituted aromatic organic polymers of the present invention are, for example, styrene, bismaleimide, N-phenylmaleimide, vinylchloride, isobutylene, butadiene, isoprene, chlorotrifluoroethylene, 2-methylpentene-1; vinyl esters of organic carboxylic acids such as vinylformate, vinylacetate, acrylonitrile, vinylmethyl, methyl, butyl, etc., esters of acrylic and methacrylic acids, etc.; divinylbenzene, triallylcyanurate, triallyltrimellitate, and N-vinylphthalimide, N-allylphthalimide, N-allyltetrachlorophthalimide, vinylsiloxanes, etc. Among the organic polymers that can be employed in combination with the imido-alkylene substituted aromatic organic polymers of the present invention are, for example, polyvinylchloride, polyethylene, polypropylene, polysulfones, polystyrene, polyurethane, organopolysiloxanes, polyesters, polyphenylene oxides, epoxide resins, etc.

Cure of the imido-alkylene substituted aromatic organic polymer, or blend thereof with any of the aforementioned organic monomers or polymers, or combination thereof, can be effected with conventional free radical initiators at temperatures of from 50° C. to 300° C., while 100° C. to 200° C. has sometimes been found to be more desirable. Acceleration of the cure of the imido-alkylene substituted aromatic organic polymer, or blend thereof, can be achieved with organic peroxides, such as dicumyl peroxide, benzoyl peroxide, tertiary butylperbenzoate, tertiary alkylperoxycarbonate, etc. The peroxides can be employed from about 0.1 percent to about 5 percent by weight, based on the total weight of the blend. In addition, high temperature radical sources can also be employed, such as the commercially available azodicarbonamides, 2,5-dimethyl, -2,5-bis(tert-butylperoxyhexane), etc. In addition, the imido-alkylene substituted aromatic polymers or blends thereof, in addition to being curable by the aforementioned free radical initiators, can be cured with heat or radiation with high energy electrons, X-rays, ultraviolet lighting, etc., depending upon the crosslink density of the resulting imido-substituted aromatic organic polymer or blend thereof, desired.

In addition to the aforementioned aliphatically unsaturated monomers and organic polymers which can be blended with the imido-alkylene substituted aromatic organic polymers of the present invention, there can be employed, by weight, fillers in proportions of from 0 to 200 parts of filler, per 100 parts of the imido-alkylene substituted aromatic organic polymer. Included among the fillers which can be employed are, for example, clay, ground quartz, silica, sand, carbon black, glass fibers, glass beads, carbon fiber, asbestos, etc. In addition, other ingredients such as solvents at from 60 percent to 90 percent by weight of the resulting curable composition also can be employed such as N-methyl pyrrolidone, dimethylacetamide, toluene, methylenechloride, as well as plasticizers such as trioctylphthalate, etc.

In order that those skilled in the art will be better able to practice the invention, the following examples are given by way of illustration and not by way of limitation. Stirring of the reactants occurred during the addition of the Friedel-Crafts catalyst. All parts are by weight.

EXAMPLE 1

Boron trifluoride was passed into a solution at 55° C. consisting of 5 parts of a polystyrene having a molecular weight of 100,000, 1.83 parts of N-chloromethylmaleimide, 70 parts of anhydrous trichloroethane and 30 parts of anhydrous nitrobenzene. After 15 hours, a product was obtained by pouring the resuling mixture into methanol. Based on method of preparation and the infrared spectrum of the product which showed a strong carbonyl absorption at 1,720 cm.$^{-1}$, the product was identified as a maleimidomethylene substituted polystyrene having about 25 mole percent of the phenyl radicals substituted with maleimidomethylene radicals based on the total moles of imido-substituted and unsubstituted phenyl radicals in the polystyrene. The identity of the polymer and the degree of substitution was further confirmed by elemental analysis. A thin film of the product containing about 1 percent of benzophenone was subjected to ultraviolet irradiation for 20 seconds. Those parts of the film that were exposed to the ultraviolet light were found to be insoluble in organic solvents. The product is useful as a photoresist.

EXAMPLE 2

Boron trifluoride was slowly bubbled into a solution of 5 parts of polystyrene having a molecular weight of about 100,000 and 2.65 parts of N-chloromethyl-5-norbornene-2,3-dicarboxylic imide and 70 parts of tetrachloroethane and 30 parts of nitrobenzene while the temperature is maintained at 55° C. over a period of about 12 hours. The imido-methylene alkylating agent was made from N-hydroxymethyl-5-norbornene-2,3-dicarboxylic imide employing thionylchloride in accordance with the method of the prior art. The mixture was then poured into methanol to effect the precipitation of the product. Based on method of preparation, the product was a polystyrene having chemically combined 3,6 - methano - 1,2,3,6 - tetrahydrophthalimidomethylene radicals. The identity of the product was confirmed by its infrared spectrum.

EXAMPLE 3

Boron trifluoride was slowly introduced into a mixture of 5 parts of polystyrene and 4.9 parts of N-chloromethylphthalimide and 70 parts of anhydrous tetrachloroethane and 30 parts of anhydrous nitrobenzene over a period of 16 hours while the mixture was stirred and maintained at a temperature of 55° C. The mixture was then poured into methanol to effect a precipitation of product which was filtered and dried. Based on method of preparation, the product was a polysyrene having chemically combined phthalimido-methylene radicals. The identity of the product was confirmed by the characteristic carbonyl absorbance at 1,715 cm.$^{-1}$ in its infrared spectrum. The polymer is useful as a molding composition with increased softening temperature as compared with unsubstituted polystyrene.

EXAMPLE 4

Boron trifluoride is slowly introduced into a 10 percent solution of styrene-butadiene copolymer and N-chloromethylmaleimide in chlorobenzene. The styrene-butadiene copolymer is prepared in accordance with the method of Amos et al., U.S. Pat. 2,694,692 utilizing a mixture of 90 mole percent of butadiene and 10 mole percent of styrene. The N-chloromethylmaleimide is present in the mixture at about an equal molar amount of the styrene utilized in making the copolymer. The solution is stirred while the boron trifluoride is introduced over a period of about 15 hours at 25° C. The mixture is then poured into methanol and a product is precipitated. Based on method of preparation, the product is a styrene-butadiene copolymer having chemically combined styryl radicals substituted with maleimidomethylene radicals.

A solution of the maleimido-methylene substituted polymer in chlorobenzene is poured onto an aluminum substrate and the solvent is allowed to evaporate at a temperature below its boiling point. The resulting film containing about 2 percent by weight of benzophenone is irradiated with ultraviolet light for a period of about 2 minutes. The film is found to be insoluble in chlorobenzene and exhibits valuable dielectric and insulating properties.

EXAMPLE 5

N-(2-chloroethyl)tetrahydrophthalimide was made by the following procedure:

A mixture of 10 parts of N-(2-hydroxyethyl)tetrahydrophthalimide, which had been prepared from tetrahydrophthalic anhydride and ethanolamine by standard procedure, was refluxed with 25 parts of thionyl chloride for about 2 hours. Excess thionyl chloride was distilled and the residue purified by recrystallization from methanol. There was obtained a crystalline product having a melting point of about 85° C. Based on method of preparation and the aforementioned melting point, the product was N-(2-chloroethyl)tetrahydrophthalimide.

A mixture was made of 2.5 parts of a polystyrene having a molecular weight of about 100,000, 2 parts of N-(2-chloroethyl)tetrahydrophthalimide and 35 parts of anhydrous tetrachloroethane. The solution was stirred at a temperature of 90° over a period of 15 hours while a slow stream of boron trifluoride was passed into the mixture. The product was precipitated upon the addition to methanol. Based on method of preparation and infrared carbonyl absorption at 1,710 cm.$^{-1}$, the product was a tetrahydrophthalimidoethyl substituted polystyrene having an average of about 300 chemically combined polystyrene units, of which about 10 mole percent are substituted with tetrahydrophthalimidoethyl radicals.

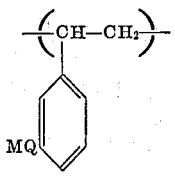

where MQ is a tetrahydrophthalimidoethyl radical, which are chemically combined with about 75 mole percent of styrene units of the formula,

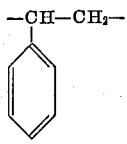

A film of the imido-substituted polystyrene is cast from a tetrachloroethane solution onto an aluminum substrate. The film is exposed to β-radiation to a dosage of 50 mr. It is found to be insoluble in several organic solvents including tetrachlorethane and useful as an organic solvent resistant coating.

EXAMPLE 6

There was added to a solution of 2 parts of polystyrene in about 50 parts of chloroform, 2 parts of N-hydroxymethyl hexachloro-5-norbornene-2,3-dicarboxylic imide in the presence of boron trifluoride, which was employed at up to saturation in the mixture. The mixture was agitated at room temperature for about 4 hours. A product was recovered by addition to methanol, which was in the form of a colorless polymer showing strong carbonyl absorption at 1720 cm.$^{-1}$. Based on method of preparation, the product was a polystyrene having phenyl radicals substituted with hexachloro - 5 - norbornene - 2,3 - dicarbonyl imidomethyl radicals. The polymer was cast onto a film from chloroform, which was converted to the insoluble state when exposed to ultraviolet light for about 20 seconds as described previously in the presence of a 1% by weight benzophenone photoinitiator.

EXAMPLE 7

There was added to a solution of 1 part of a polychloro styrene, EXP-MX4616 from Dow Chemical Company, in about 10 parts of chloroform, 0.24 part of N-hydroxymethylmaleimide. Boron trifluoride was passed into the resulting mixture at room temperature with stirring. Upon effecting a detectable increase in viscosity of the solution, methanol was added in an amount to effect the precipitation of product. Based on method of preparation, the product was a maleimidomethyl substituted polychlorostyrene. Elemental analysis of the product showed that it contained about 6 mole percent of maleimidomethyl substituted phenyl radicals.

A film of the product was cast from a chloroform solution containing a 1% concentration of benzophenone. There was obtained a film exhibiting a substantial increase in solvent resistance when it was exposed to ultraviolet light for a period of about 20 seconds. This established that the imido-substituted polystyrene could be employed as a photoresist.

EXAMPLE 8

There is added 2 parts of boron trifluoride to a solution at room temperature of 10.4 parts of polystyrene and 1.3 parts of N-hydroxymethyl maleimide, dissolved in about 20 parts of methylene chloride and 30 parts of nitromethane. A product is obtained by pouring the resulting mixture into methanol after it is stirred for about fifteen hours. The product is dried in vacuo at 50° C. Based on method of preparation, the product is a maleimidomethyl substituted polystyrene.

The above maleimidomethyl substituted polystyrene is blended with equal parts by weight of poly(2,6-dimethylphenyleneoxide) having a molecular weight of about 50,000. A finished structure is obtained when the blend is mloded at a temperature of about 150–200° C. for about 60 minutes. The part exhibits valuable solvent resistance and can be employed in making automobile components requiring high performance.

EXAMPLE 9

A solution of the above described maleimidomethyl substituted polystyrene is prepared by blending 1 part of the polystyrene with 9 parts of styrene monomer. There is added to the solution, 1% by weight of benzoyl peroxide. The resulting composition is poured into a mold and heated at 100° C. for about 6 hours. There is obtained a finished reproduction of the mold. The part exhibits valuable solvent resistant properties.

Although the above examples are limited to only a few of the imido alkylene substituted aromatic carbocyclic polymers which can be made in accordance with the practice of the invention, it should be understood that the present invention is directed to a much broader class of imido-substituted aromatic carbocyclic polymers, which can be made by effecting reaction between polymers included by Formula 2 and imido alkylating agents as shown by Formula 5.

We claim:

1. A film forming aromatic carbocyclic organic polymer which can be employed as a molding resin, or solvent resistant coating compound, which consists essentially of from 5 to 500 chemically combined units selected from the group consisting of,

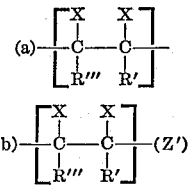

and a mixture of (a) and (b), where at least one mole percent of such units have an imido-alkylene group of the formula,

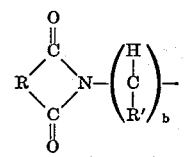

directly joined to a ring carbon atom of an aromatic carbocyclic radical, where R is a divalent organo radical free of aliphatic unsaturation selected from the group consisting of hydrocarbon radicals and halogenated hydrocarbon radicals, R' is selected from the group consisting of hydrogen, monovalent hydrocarbon radicals and halogenated monovalent hydrocarbon radicals, R''' is a monovalent organo radical selected from the group consisting of hydrocarbon radicals or halogenated radicals, b is an integer having a value of from 1 to 4, inclusive, and Z' is a divalent organo radical having the formula

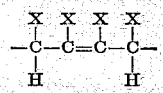

and X is a radical selected from the group consisting of hydrogen, alkyl, and mixtures thereof.

2. A composition in accordance with claim 1, where the film forming aromatic carbocyclic organic polymer is an imido alkyl substituted halogenated polystyrene.

3. A composition in accordance with claim 1, where the aromatic carbocyclic organic polymer is substituted with a halogenated imido alkyl group.

4. An imido-methylene substituted styrene butadiene copolymer in accordance with claim 1.

5. A film forming polystyrene in accordance with claim 1.

6. A film forming aromatic carbocyclic organic polymer which can be employed as a molding resin, or solvent resistant coating compound, which consists essentially of from 5 to 500 chemically combined units selected from the group consisting of,

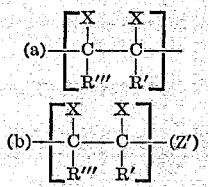

and a mixture of (a) and (b), where at least one mole percent of such units have an imido-alkylene group of the formula,

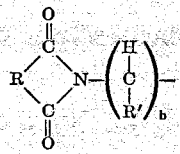

directly joined to a ring carbon atom of an aromatic carbocyclic radical, where R is a divalent aliphatically unsaturated hydrocarbon radical, R' is selected from the group consisting of hydrogen, monovalent hydrocarbon radicals and halogenated monovalent hydrocarbon radicals, R''' is a monovalent organo radical selected from the group consisting of hydrocarbon radicals or halogenated hydrocarbon radicals, b is an integer having a value of from 1 to 4, inclusive, and Z' is a divalent organo radical having the formula

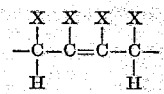

and X is a radical selected from the group consisting of hydrogen, alkyl, and mixtures thereof.

7. A maleimido-methylene substituted polystyrene in accordance with claim 6.

8. A maleimido-methylene substituted polystyrene in accordance with claim 6.

9. A film forming organic polymer in accordance with claim 6, having monovalent aromatic carbocyclic organic radicals substituted with imido-methylene radicals.

10. A film forming imido-methylene substituted organic polymer in accordance with claim 6, which is substituted with aliphatically unsaturated imido-methylene radicals.

11. A phthalimidoethylene substituted polystyrene in accordance with claim 6.

References Cited
UNITED STATES PATENTS

| | | |
|---|---|---|
| 3,153,014 | 10/1964 | Fletcher et al. ___ 260—78 UA |
| 3,301,826 | 1/1967 | Tawney _____ 260—78 UA |
| 3,506,624 | 4/1970 | Behrens _____ 260—78 UA |

HAROLD D. ANDERSON, Primary Examiner

U.S. Cl. X.R.

117—161 UA, 161 UN; 204—159.14, 159.22; 260—30.2, 31.8 R, 32.6 N, 33.6 R, 33.8 R, 41 R, 260—85.1, 85.5 HC, 85.7, 86.7, 93.5 A, 88.1 PN, 880, 881, 884, 885, 897, 899